(12) United States Patent
Klimek et al.

(10) Patent No.: US 8,585,132 B2
(45) Date of Patent: Nov. 19, 2013

(54) VEHICLE HAVING ENERGY ACCUMULATOR AREA

(75) Inventors: Stanislaw Klimek, Frankfurt (DE); Martin Schwarz, Stadecken-Elsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 567 days.

(21) Appl. No.: 12/887,384

(22) Filed: Sep. 21, 2010

(65) Prior Publication Data

US 2011/0068606 A1 Mar. 24, 2011

(30) Foreign Application Priority Data

Sep. 22, 2009 (DE) .................. 10 2009 042 513

(51) Int. Cl.
*B60N 99/00* (2006.01)

(52) U.S. Cl.
USPC .................. 296/193.07; 296/187.08

(58) Field of Classification Search
USPC ............ 296/187.09, 193.07, 203.01, 203.02, 296/203.04, 204, 187; 280/124.109, 785
See application file for complete search history.

(56) References Cited

U.S. PATENT DOCUMENTS

| 4,058,182 | A | 11/1977 | Huber |
| 6,824,168 | B2 | 11/2004 | Kawazu et al. |
| 6,983,945 | B2 | 1/2006 | Kawasaki et al. |
| 7,070,015 | B2 | 7/2006 | Mathews et al. |
| 7,073,824 | B2 | 7/2006 | Uhara et al. |
| 7,204,547 | B2 | 4/2007 | Okana et al. |
| 7,264,277 | B2 | 9/2007 | Ono et al. |
| 7,513,329 | B2 | 4/2009 | Nakashima et al. |
| 2003/0047932 | A1 | 3/2003 | Kawazu et al. |
| 2004/0155449 | A1 | 8/2004 | Hashimura |
| 2004/0226765 | A1 | 11/2004 | Mathews et al. |
| 2009/0001761 | A1 | 1/2009 | Yasuhara et al. |
| 2009/0001766 | A1 | 1/2009 | Kurata |
| 2009/0001767 | A1 | 1/2009 | Yamaguchi et al. |

FOREIGN PATENT DOCUMENTS

| CA | 2399523 A1 | 2/2003 |
| DE | 6605147 U | 4/1970 |
| DE | 2522844 A1 | 12/1976 |
| DE | 4129737 A1 | 3/1993 |
| DE | 10239500 A1 | 9/2003 |
| DE | 102004023754 A1 | 12/2004 |
| DE | 102004005490 B3 | 2/2005 |

(Continued)

OTHER PUBLICATIONS

British Patent Office, British Search Report for British Application No. 1015197.5, Dec. 23, 2010.

(Continued)

*Primary Examiner* — Lori Lyjak
(74) *Attorney, Agent, or Firm* — Ingrassia Fisher & Lorenz, P.C.

(57) ABSTRACT

A vehicle is provided that includes, but is not limited to an energy accumulator in an energy accumulator area. The vehicle also includes, but is not limited to a rear axle area having a rear axle frame and a front axle area having a front axle frame. Furthermore, the vehicle includes, but is not limited to interrupted crash load pathways in the vehicle floor area, which are limited to the vehicle passenger compartment. The energy accumulator is situated on a carrier system in the vehicle floor area, the carrier system closing the interrupted crash load pathways of the vehicle between the rear axle frame and/or the front axle frame.

20 Claims, 9 Drawing Sheets

(56) References Cited

FOREIGN PATENT DOCUMENTS

| | | | |
|---|---|---|---|
| GB | 1179282 A | 1/1970 |
| GB | 1528517 A | 10/1978 |
| GB | 2401587 A | 11/2004 |
| JP | 7246842 A | 9/1995 |
| JP | 2003127907 A | 5/2003 |
| JP | 2004330855 A | 11/2004 |
| JP | 2005132348 A | 5/2005 |
| JP | 2006069475 A | 3/2006 |
| JP | 2006096185 A | 4/2006 |

OTHER PUBLICATIONS

German Patent Office, German Search Report for German Application No. 102009042513.6, Aug. 25, 2010.

though the invention is not limited in its application to electrically driven vehicles, but rather includes all types of energy accumulators, which may have the form of rechargeable batteries or the form of tanks for compressed or liquefied gas or liquid fuels.

VEHICLE HAVING ENERGY ACCUMULATOR AREA

CROSS-REFERENCE TO RELATED APPLICATION

This application claims priority to German Patent Application No. 102009042513.6, filed Sep. 22, 2009, which is incorporated herein by reference in its entirety.

TECHNICAL FIELD

The invention relates to a vehicle having an energy accumulator in an energy accumulator area. The vehicle has a rear axle area having a rear axle frame and a front axle area having a front axle frame. Furthermore, the vehicle has interrupted crash load pathways in the vehicle floor area, which are limited to the vehicle passenger compartment.

BACKGROUND

A vehicle protects the limbs, in particular the legs, of the vehicle passengers in the event of a frontal and a rear crash using its crash load pathways, which are limited in the vehicle floor area to the vehicle passenger compartment. Through the limitation of the crash load pathways in the vehicle floor area, an interruption of the crash load pathways both to the rear axle area and to the front axle area results. This means that in the event of a rear crash, the rear axle may be pressed in the direction toward the vehicle passenger compartment and in the event of a frontal crash, the front axle frame may be pressed in the direction toward the vehicle passenger compartment.

For this purpose, FIG. 8 shows a vehicle floor area 8 of a vehicle 50 having rear axle area 4 according to the prior art. The rear wheels 26 and 27 are articulated with a multi-link rear axle 17 in the rear axle area 4. The rear axle 17 is in turn fixed on a rear axle frame 5 of the vehicle body 28. A fuel tank is situated in the rear axle frame 5 as an energy accumulator 3 in the typical vehicle 50.

In the vehicle floor area 8, crash load pathways 6 and 7 are limited to the vehicle passenger compartment 9. The crash load pathways 6 form extensions of the front axle frame, and the crash load pathways 7 are formed by tunnel edge profiles of a central tunnel in the floor area below the vehicle passenger compartment. The vehicle passenger compartment 9 is reinforced by the crash load pathways 6 and 7, however, the rear axle frame 5 having the rear axle 17 can disadvantageously be displaced in the vehicle floor area 8 in the direction toward the vehicle passenger compartment 9 in the event of a rear collision.

An electrically driven vehicle, in particular a passenger automobile, is known from the publication DE 41 29 737 A1, whose rear axle is driven in the rear axle area by an electric motor, the battery being situated between the electric motor and rear seats of the vehicle inside the vehicle passenger compartment.

FIG. 9 shows a schematic top view of the configuration of the electric motor 31 having its drive axle 32 of the known electrically driven vehicle 30. The energy accumulator 3 in the form of a battery is situated in a frame 29, which has two crossbeams 40 and 41 situated one over another in the rear area toward the electric motor 31 and crossbeams 46 and 47 situated one over another in the front area toward the rear seat of the vehicle 30. In addition, the frame 29 further comprises longitudinal carriers 42 and 43 situated one over another on one side of the vehicle 30 and longitudinal carriers 44 and 45 situated one over another on the diametrically opposing side of the vehicle 30.

Corresponding plates are situated between the lower and upper crossbeams or longitudinal carriers, so that the frame 29, which is open on top, can receive a battery as the energy accumulator 3, the battery being fixed with the aid of tension straps 48 and 49 in the frame 29. The frame 29 is situated and reinforced between longitudinal carriers 37 and 38 of the vehicle body of this electric vehicle 30 and supports the vehicle passenger compartment in the rear seat area in the event of a side impact.

A disadvantage of this electric vehicle 30 is the complex, heavy frame for the energy accumulator area, which is fixed between the vehicle body longitudinal carriers 37 and 38 and from which the battery accumulator device can be installed and removed via a lid in the vehicle passenger compartment. Such a frame 29 for the energy accumulator area 2 of a vehicle 30 means a significant increase in weight and, because no crash load pathways are provided in the longitudinal direction, parallel to the longitudinal carriers 37 and 38, only provides a supporting lateral crash protection, and does not contribute to the protection in the event of frontal or rear accident impacts.

In view of the foregoing, at least one object is to provide a vehicle having an energy accumulator in an energy accumulator area in the vehicle, the energy accumulator area contributing to increasing the vehicle body rigidity, on the one hand, and providing a crash-safe area for the energy accumulator, on the other hand. In addition, other objects, desirable features and characteristics will become apparent from the subsequent summary and detailed description, and the appended claims, taken in conjunction with the accompanying drawings and this background.

SUMMARY

According to an embodiment of the invention, a vehicle having an energy accumulator in an energy accumulator area is provided. The vehicle has a rear axle area having a rear axle frame and a front axle area having a front axle frame. Furthermore, the vehicle has interrupted crash load pathways in the vehicle floor area, which are limited to the vehicle passenger compartment. The energy accumulator is situated on a carrier system in the vehicle floor area, the carrier system closing the interrupted crash load pathways of the vehicle between the rear axle frame and/or the front axle frame.

This vehicle has the advantage that because of the carrier system in the energy accumulator area for the energy accumulator, the rear axle area is prevented, in the event of a rear accident impact, from penetrating in the direction toward the vehicle passenger compartment. In addition, more effective introduction of crash loads via the crash load pathways is achieved in relation to typical vehicles by the closing of such crash load pathways with the aid of the carrier system for the energy accumulator in the energy accumulator area. In addition, other vehicle body structures of the vehicle may be significantly reduced in their weight by the reinforcement of the now closed crash load pathways by the carrier system. In particular for convertible vehicles, an advantage result of increased vehicle body rigidity in the floor area and thus improved protection for the passengers of a convertible vehicle.

In one embodiment of the invention, the energy accumulator is situated in the area of rear seats. This rear seat area is additionally supported by the reinforced and additional crash load pathways, which were provided with the aid of the carrier system in the energy accumulator area, so that the safety of the individuals on the rear seats in the event of a rear accident impact is improved. A more secure storage space below the rear seats of the vehicle is simultaneously also provided for the energy accumulator. Because interrupted crash load pathways are also provided in the front axle area of the vehicle, situating additional energy accumulators in the area of front seats can also be advantageous for the protection of the passengers.

Through the housing of energy accumulators both below the front seats and also below the rear seats, the vehicle can be equipped with a manifold variation of energy accumulators, without additional space being required for the energy storage. It is possible to access both the energy accumulator below the front seats and also the energy accumulator below the rear seats from the vehicle passenger compartment by folding over the corresponding seat positions, for example.

On the other hand, it is additionally provided that the energy accumulator is situated below rear seats outside the vehicle passenger compartment. In this case, the energy accumulator can be installed by removing the carrier system on the vehicle floor and, if necessary, also replaced, the carrier structure being situated in the floor area after positioning of the energy accumulator. The same possibility exists for energy accumulators which are situated below front seats, so that these may also be removed and installed as well as replaced from the floor area outside the vehicle passenger compartment.

In order to close the interrupted crash load pathways, the carrier system has longitudinal carriers, which extend the crash load pathways in the floor area of the vehicle between the front wheel frame and/or the rear wheel frame and thus close the interrupted crash load pathways. These longitudinal carriers of the carrier system may be screwed or fixed at their first ends on the interrupted crash load pathways in the floor area of the vehicle, while their second ends are screwed onto points of the rear wheel axle. In addition to this possibility of screwing the second ends onto points of the rear axle, it is also possible to screw the second ends of the longitudinal carriers of the carrier system onto separate points of the rear axle. Finally, the longitudinal carriers of the carrier system may be screwed using their second ends onto points of the rear axle frame. These three different possibilities may be used depending on the predefined structure of rear axle, rear axle frame, and the contour of the structure of the rear axle.

Instead of the fixation of the first ends directly on the interrupted crash load pathways, it is also possible to screw them onto areas of a central tunnel structure. These are to be connected to side profile areas of the central tunnel structure, in order to achieve a reinforced longitudinal rigidity for the vehicle which is additionally increased by the longitudinal carriers of the carrier system for the battery accumulator area.

In order to increase the stability of the carrier system, the carrier system can have crossbeams, which are situated between the longitudinal carriers and are fixed thereon. The crossbeams may be situated in parallel or may also cross over one another, in order to increase the connection rigidity of the floor area in the area of the energy accumulator. The energy accumulator area can occupy the space of a typical fuel tank area above the carrier system. Fuel cells having a fuel tank or battery cells, in particular lithium-ion cells, are preferably provided for the energy accumulator area. In addition, liquefied gas accumulators, such as LPG accumulators, or natural gas accumulators, such as CNG accumulators, or hydrogen accumulators may also be situated in the energy accumulator area.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
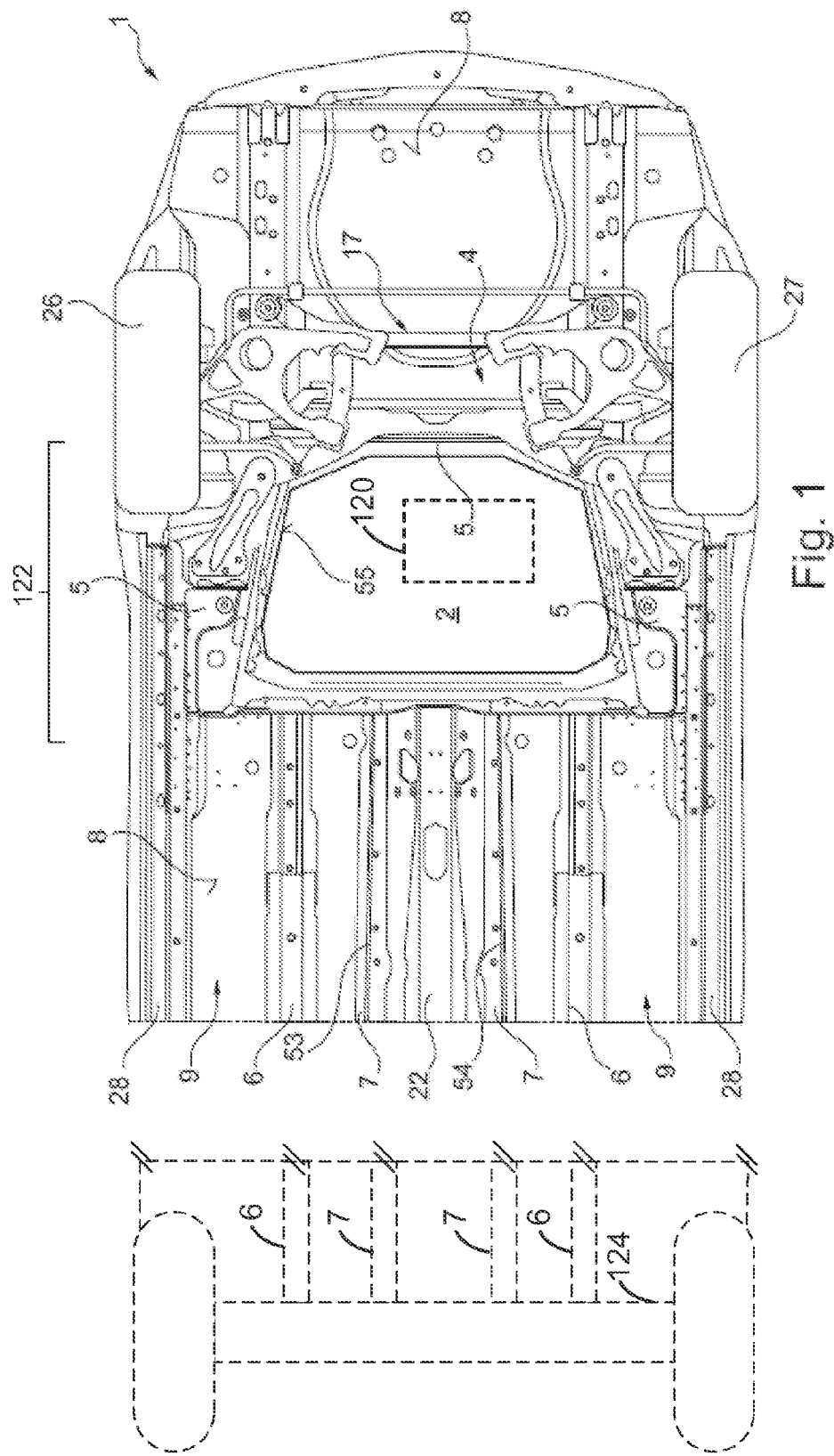
FIG. 1 shows a schematic bottom view of a vehicle in the area of a rear axle frame of the vehicle having the provided energy accumulator area.
Figure 2:
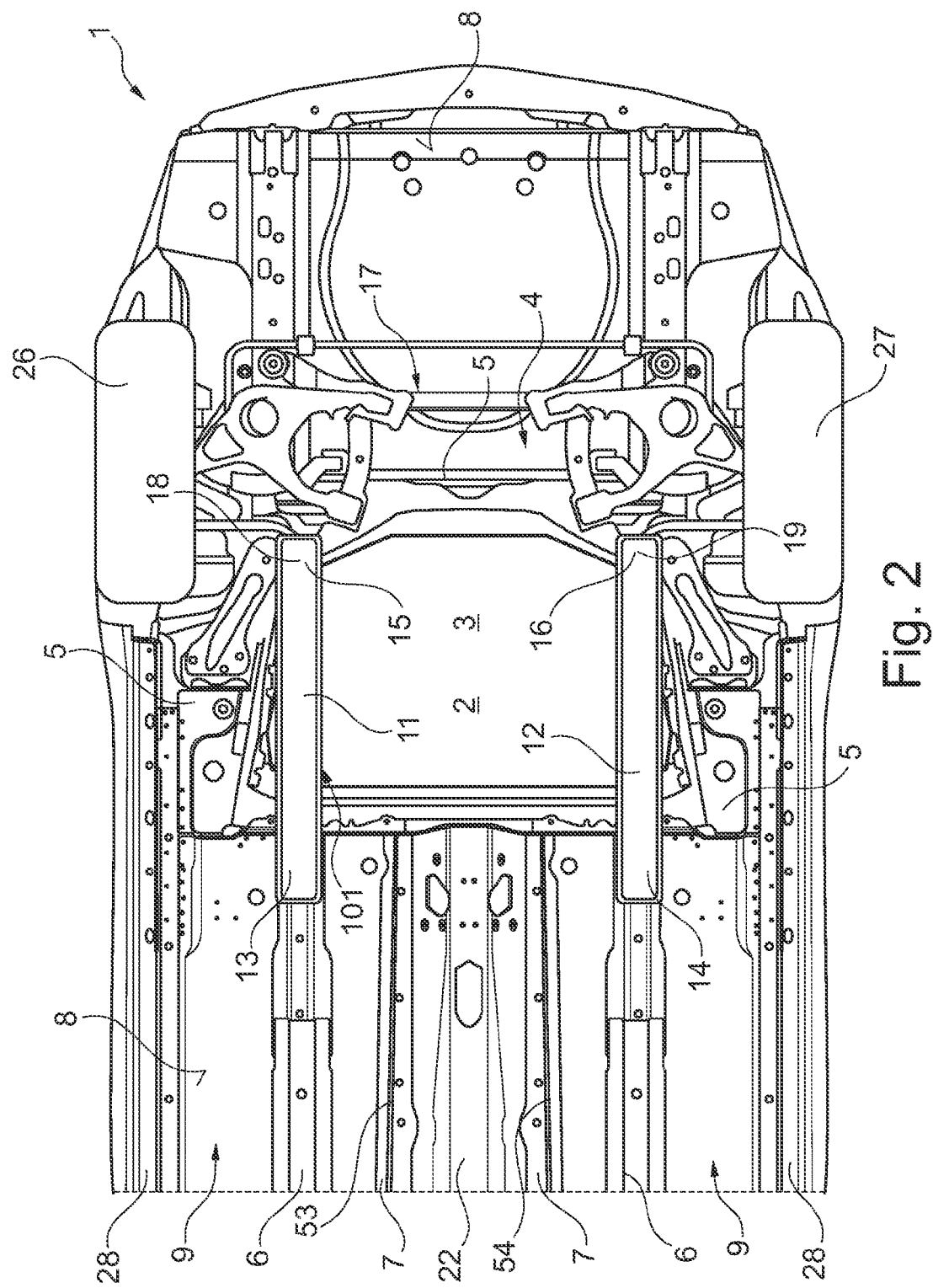
FIG. 2 shows a schematic bottom view of the vehicle according to FIG. 1 having parallel longitudinal carriers of the carrier system according to a first embodiment of the invention.

FIG. 1 shows a schematic bottom view of a vehicle 1 in the area of a rear axle frame 5 of the vehicle 1 having the provided energy accumulator area 2. As schematically shown, the energy accumulator area 2 may include an energy accumulator 120, which may represent a fuel tank, a battery cell, a liquefied gas accumulator (LPG), a natural gas accumulator (CNG), and/or a hydrogen accumulator (H2). Similarly, FIG. 1 schematically shows a rear seat area 122 and a front axle area with a front axle frame 124. As described below, the load pathways 6, 7 extend between the axles 17, 124, although the pathways 6, 7 are separated in the schematic representation of the front axle frame 124 for clarity. In the first embodiment of a carrier system 101 shown in FIG. 2, first ends 13 and 14 of the longitudinal carriers 11 and 12 are screwed onto the previously interrupted crash load pathways 6 of the vehicle 1 and are fixed at their second ends 15 and 16 on separate fixing points 18 and 19 of the vehicle rear axle 17 by screw connections. These separate points were selected in this embodiment of the invention to form a linear parallel extension and thus additional crash load pathways.

Figure 3:
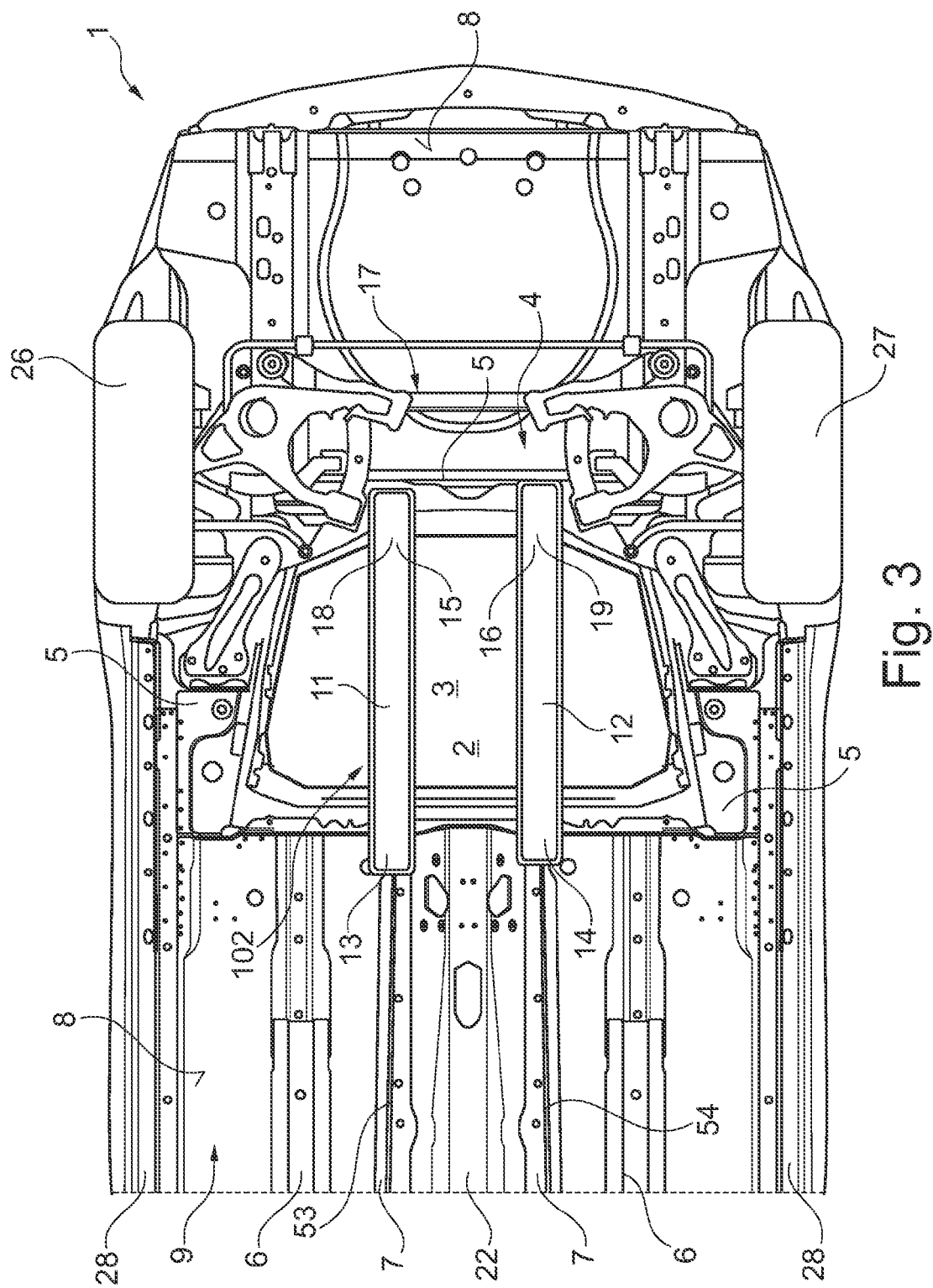
FIG. 3 shows a schematic bottom view of the vehicle according to FIG. 1 having parallel longitudinal carriers according to a second embodiment of the invention.

In the following figures, components having identical functions as in the preceding figures are identified by identical reference numerals and are not explained separately. FIG. 3 shows a schematic bottom view of the vehicle 1 according to FIG. 1 having parallel longitudinal carriers according to a second embodiment of the invention. In this case, the crash load pathways 7 of the central tunnel structure are extended, the first ends 13 and 14 of the longitudinal carriers 11 and 12 being screwed onto the previously interrupted crash load pathways 7 of the tunnel structure of the vehicle 1 and being fixed at their second ends 15 and 16 on fixing points 18 and 19 of the vehicle rear axle 17 by screw connections. The second fixing points 18 and 19 are situated closer to one another than in the first embodiment according to FIG. 2.

Figure 4:
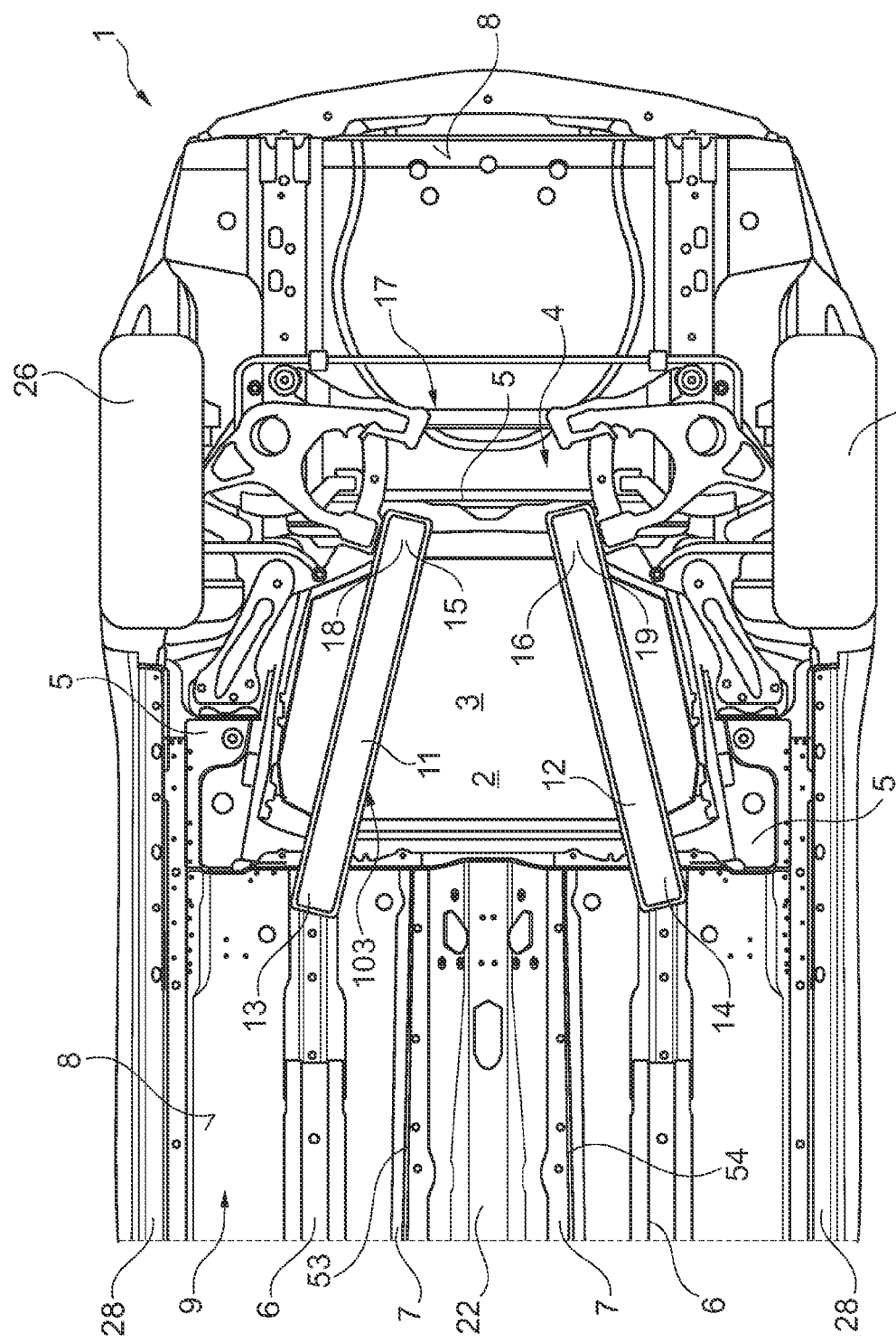
FIG. 4 shows a schematic bottom view of the vehicle according to FIG. 1 having longitudinal carriers of a carrier system according to a third embodiment of the invention.

FIG. 4 shows a schematic bottom view of the vehicle 1 according to FIG. 1 having longitudinal carriers 11 and 12 of a carrier system 103 according to a third embodiment of the invention. The first ends 13 and 14 of the longitudinal carriers 11 and 12 are screwed onto the previously interrupted crash load pathways 6 of the vehicle 1 in this embodiment and are fixed at their second ends 15 and 16 on separate fixing points 18 and 19 of the vehicle rear axle 17, as shown in FIG. 3, by screw connections. As a result, the energy storage region is carried by the longitudinal members 11 and 12 which have a shorter spacing towards the rear axle 17 than at their first ends 13 and 14.

Figure 5:
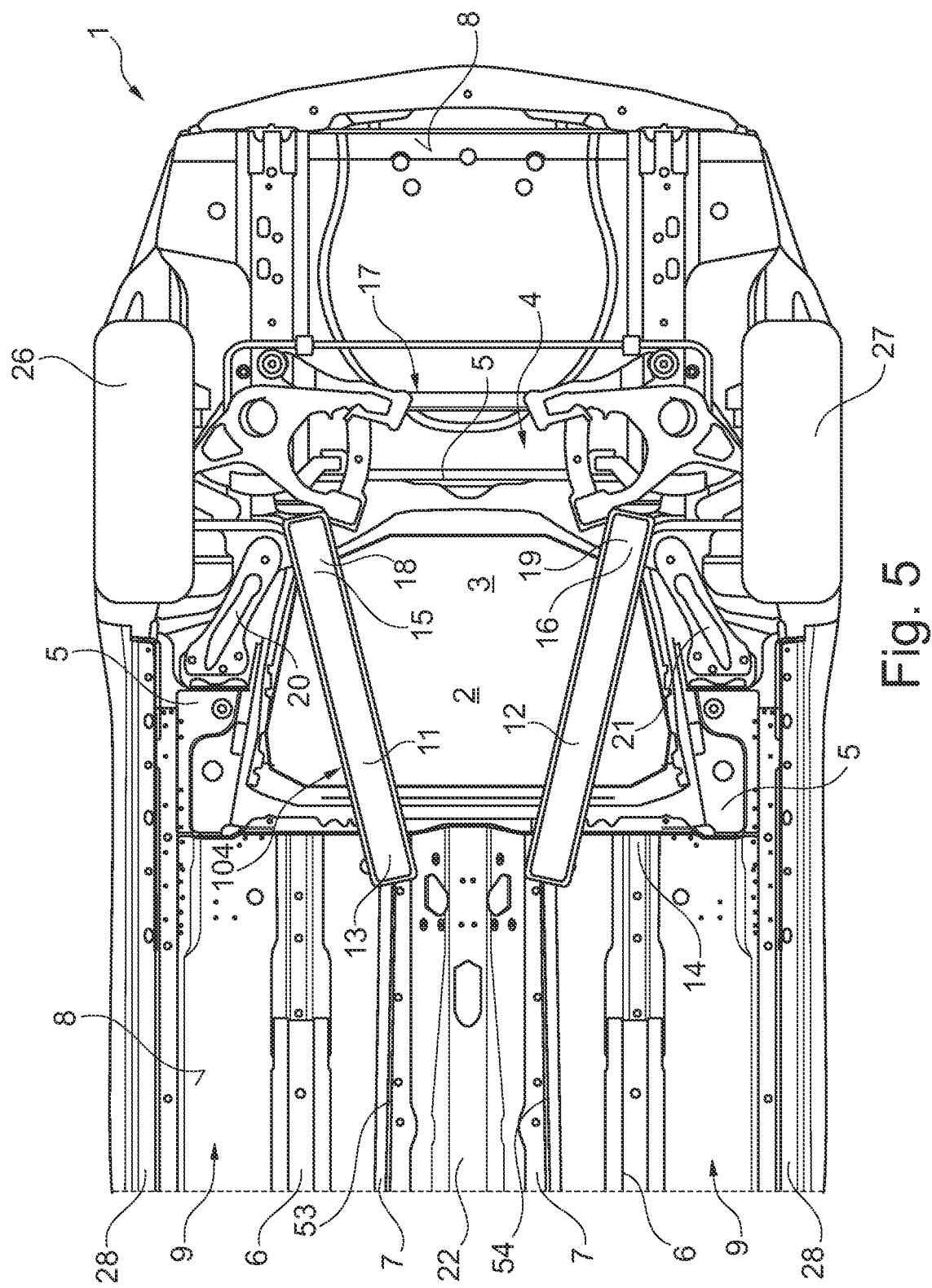
FIG. 5 shows a schematic bottom view of the vehicle according to FIG. 1 having longitudinal carriers of a carrier system according to a fourth embodiment of the invention.

FIG. 5 shows a schematic bottom view of the vehicle 1 according to FIG. 1 having longitudinal carriers 11 and 12 of a carrier system 104 according to a fourth embodiment of the invention. In this embodiment, the first ends 13 and 14 of the longitudinal carriers 11 and 12 are offset transversely to the longitudinal direction and are situated on tunnel edge profiles 53 and 54 of the central tunnel structure 22. A high lateral rigidity is thus achieved with the aid of the two longitudinal carriers 11 and 12 for the floor area of the vehicle 1 and for the energy accumulator area 2. The longitudinal carriers may be spread still further to the rear axle 17, if their second ends 15 and 16 are connected to points 20 and 21 of the rear axle frame 5.

Figure 6:
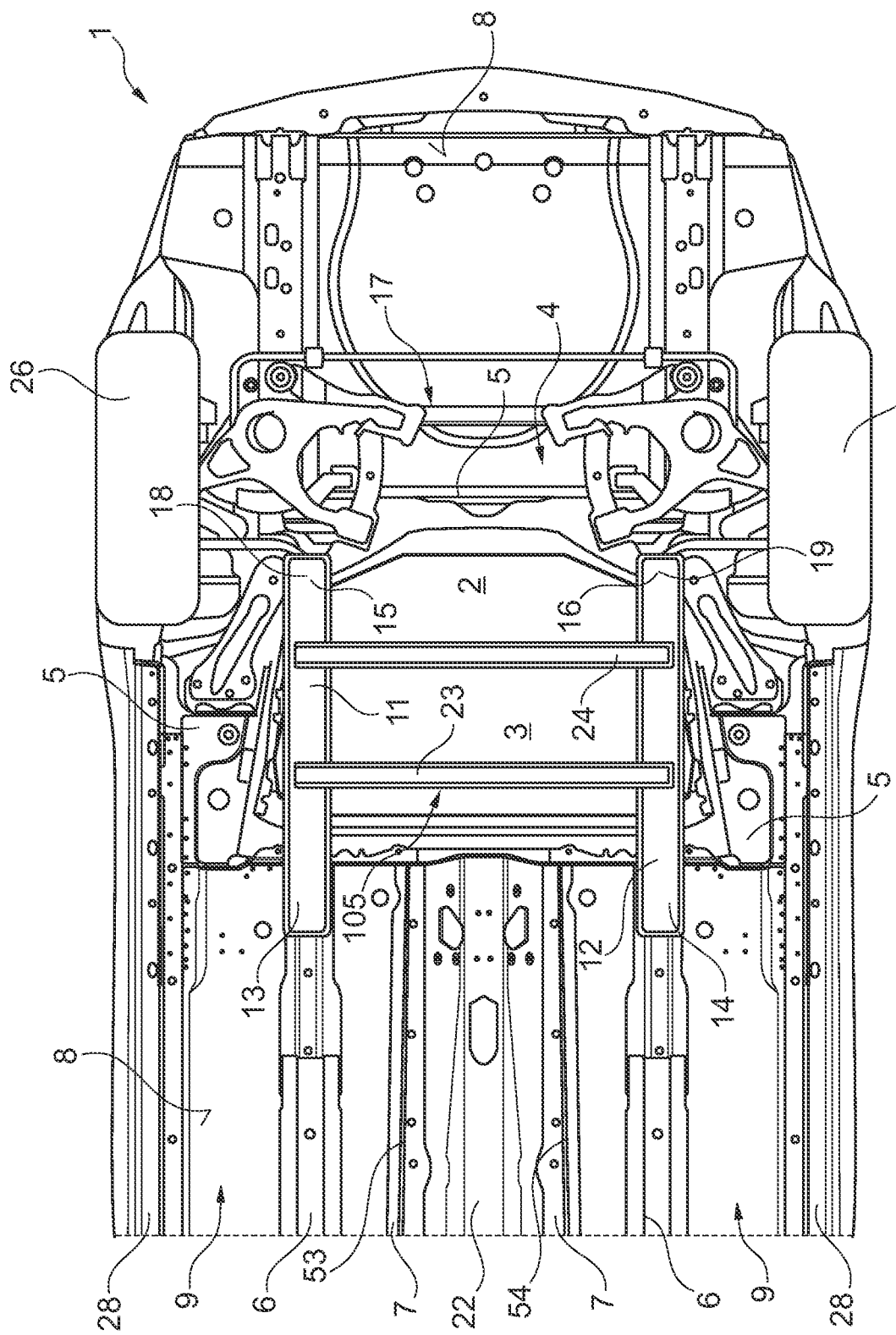
FIG. 6 shows a schematic bottom view of the vehicle according to FIG. 1 having parallel longitudinal carriers and parallel crossbeams of a carrier system according to a fifth embodiment of the invention.
Figure 7:
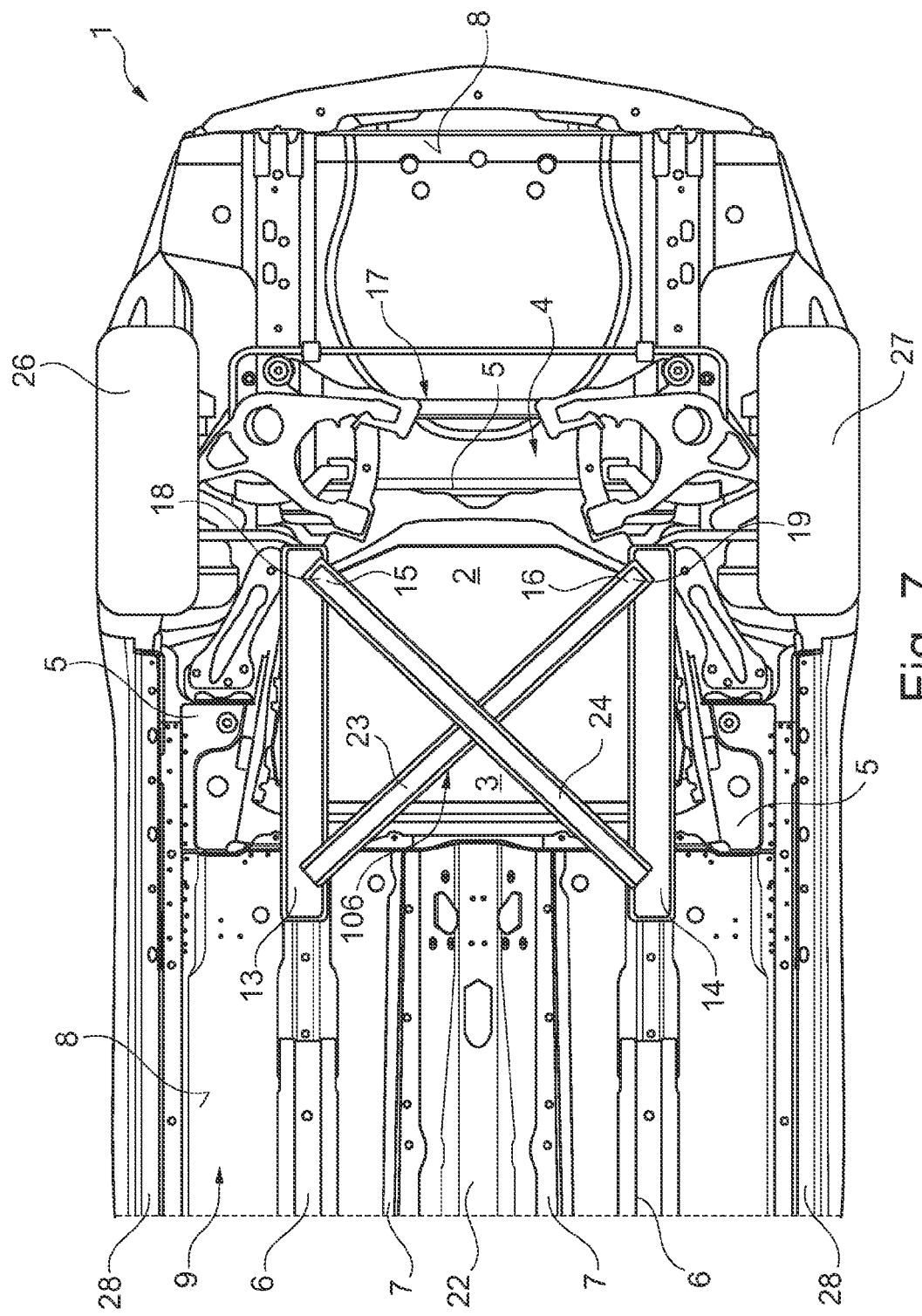
FIG. 7 shows a schematic bottom view of the vehicle according to FIG. 1 having parallel longitudinal carriers and crossed crossbeams of a carrier system according to a sixth embodiment of the invention.
Figure 8:
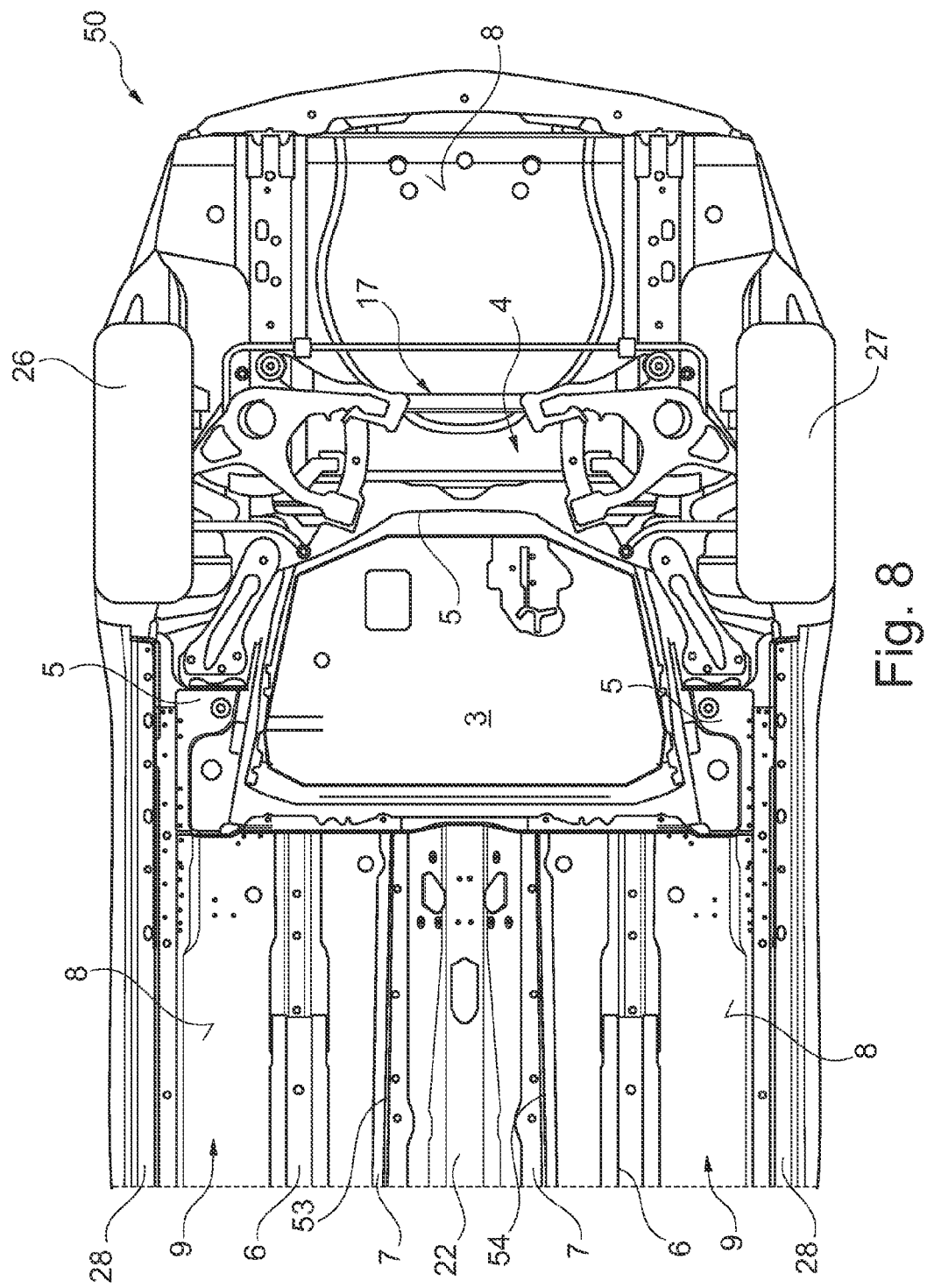
FIG. 8 shows a vehicle floor area of a vehicle having rear axle area according to the prior art.
Figure 9:
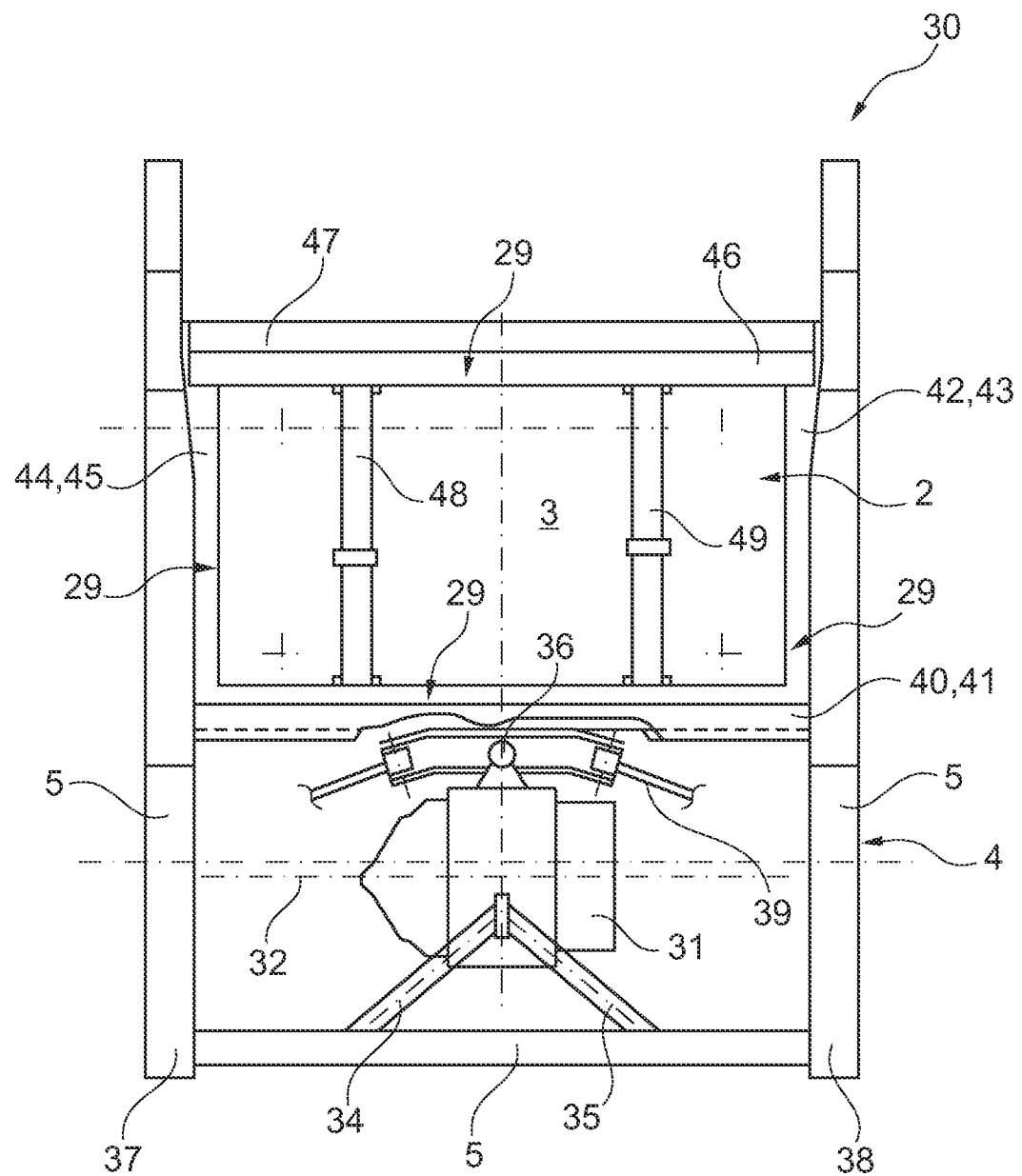
FIG. 9 shows a schematic top view of the configuration of the electric motor having its drive axle of the known electrically driven vehicle.

While the carrier system 10 in the previously shown embodiments of the invention only has two longitudinal carriers 11 and 12 which extend the crash load pathways 6 and 7, which achieve a limited lateral stability in addition to the fundamental longitudinal stability for the floor area of the vehicle because of the differing fixation of the first ends 13 and 14 and the second ends 15 and 16, in following FIG. 6 and FIG. 7, a schematic bottom view of the vehicle 1 according to FIG. 1 having a further stiffening of the carrier systems 105 and 106 in an energy accumulator area is shown.

For this purpose, FIG. 6 shows a schematic bottom view of the vehicle 1 according to FIG. 1 having parallel longitudinal carriers 11 and 12 and parallel crossbeams 23 and 24 of a carrier system 105 according to a fifth embodiment of the invention. The further stiffening in this carrier system 105 is achieved by the additional crossbeams 23 and 24, which reinforce the middle area of the longitudinal carriers 11 and 12 in the transverse direction here.

FIG. 7 shows a schematic bottom view of the vehicle 1 according to FIG. 1 having parallel longitudinal carriers 11 and 12 and crossed crossbeams 23, 24 of a carrier system 106 according to a sixth embodiment of the invention. Increased torsional rigidity for the carrier system 106 is achieved using the crossed crossbeams 23, 24. The carrying capacity of the carrier structure 106 is also simultaneously improved. It is thus possible through the carrier systems 101 to 106 according to the invention to achieve carrier structures which are adaptable extraordinarily flexibly to the various load cases and various structures of the vehicle floor 8 for an energy accumulator 3, and to achieve reinforced crash safety of a vehicle 1 with simultaneous safer housing of energy accumulators 3.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle, comprising:
    a passenger compartment;
    a floor area;
    a carrier system in the floor area
    a rear axle area comprising a rear axle frame;
    a front axle comprising a front axle frame;
    interrupted crash load pathways in the floor area that are limited to the passenger compartment; and
    an energy accumulator area situated on the carrier system in the floor area, and the carrier system is adapted to close the interrupted crash load pathways of the vehicle between at least one of the rear axle frame or the front axle frame,
    wherein the carrier system comprises longitudinal carriers that extend the interrupted crash load pathways in the floor area to at least one of the front axle frame or the rear axle frame and thus close the interrupted crash load pathways.

2. The vehicle according to claim 1, the energy accumulator area is situated in an area of a rear seat.

3. The vehicle according to claim 1, wherein the energy accumulator area is situated in an area of a passenger seat.

4. The vehicle according to claim 1, wherein the energy accumulator area is situated below a rear seat and outside the passenger compartment.

5. The vehicle according to claim 1, wherein the energy accumulator area is situated below a passenger seat and outside the passenger compartment.

6. The vehicle according to claim 1, wherein the longitudinal carriers of the carrier system are screwed at first ends onto the interrupted crash load pathways.

7. The vehicle according to claim 6, wherein the longitudinal carriers of the carrier system are screwed at second ends onto points of the rear axle frame.

8. The vehicle according to claim 1, wherein the longitudinal carriers of the carrier system are screwed at second ends onto separate points of the rear axle frame.

9. The vehicle according to claim 1, wherein the longitudinal carriers of the carrier system are screwed at second ends onto points of the rear axle frame.

10. The vehicle according to claim 1, wherein the longitudinal carriers of the carrier system are screwed at first ends onto a central tunnel structure.

11. The vehicle according to claim 7, wherein the carrier system comprises crossbeams that are fixed on the longitudinal carriers.

12. The vehicle according to claim 11, wherein the crossbeams that are fixed on the longitudinal carriers are adapted to cross over one another.

13. The vehicle according to claim 1, wherein a space of a typical fuel tank area above the carrier system is provided as the energy accumulator area.

14. The vehicle according to claim 1, wherein the energy accumulator area comprises fuel cells that comprise a fuel tank.

15. The vehicle according to claim 1, wherein the energy accumulator area comprises fuel cells that comprise a battery cell.

16. The vehicle according to claim 15, wherein the battery cell is a lithium-ion cell.

17. The vehicle according to claim 1, wherein the energy accumulator area comprises a liquefied gas accumulator (LPG).

18. The vehicle according to claim 1, wherein the energy accumulator area comprises a natural gas accumulator (CNG).

19. The vehicle according to claim 1, wherein the energy accumulator area comprises a hydrogen accumulator ($H_2$).

20. A vehicle, comprising:
a passenger compartment;
a body frame having a first side frame member and a second side frame member;
a floor area between the first and second side frame members;
a first axle area comprising a first axle frame extending generally perpendicular to the first and second side frame members;
a second axle comprising a second axle frame extending generally perpendicular to the first and second side frame members;
at least one crash load pathway in the floor area that is limited to the passenger compartment, wherein the at least one crash load pathway has a first pathway end mounted to the first axle frame and a second pathway end; and
a carrier system in the floor area in a position interior to the first and second side frame members, the carrier system including at least one longitudinal carrier, wherein the at least one longitudinal carrier has a first carrier end mounted to the second pathway end and a second carrier end mounted to the second axle frame; and
an energy accumulator area situated on the carrier system in the floor area.

* * * * *